Aug. 14, 1962    J. E. B. SAUER    3,049,663
IGNITION AND ELECTRICAL CIRCUIT TESTING DEVICE
Filed Sept. 8, 1959
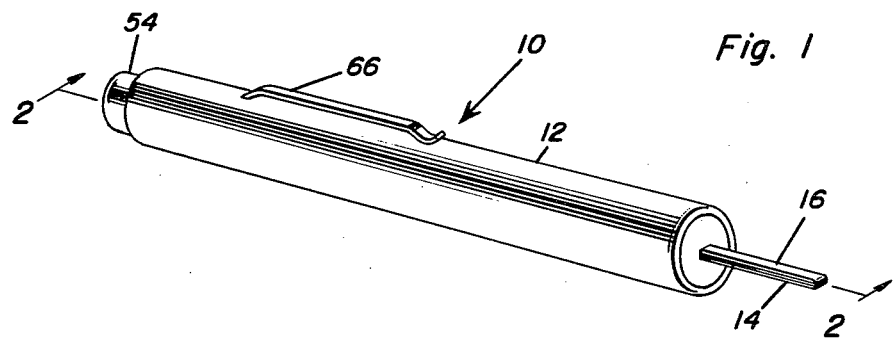
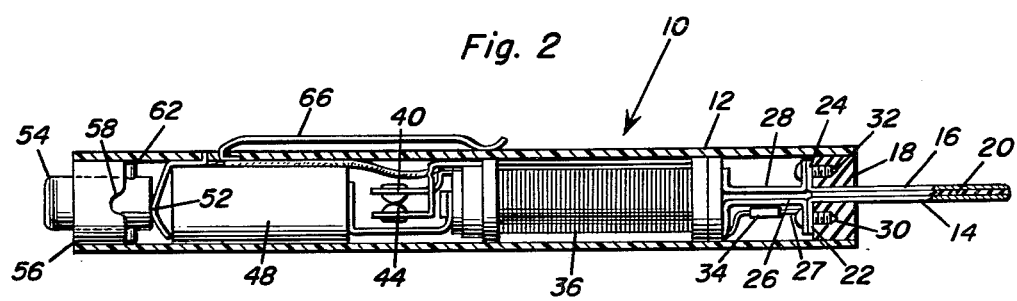
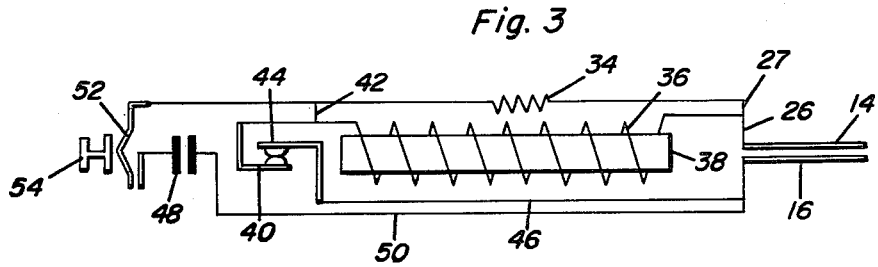
John E. B. Sauer
INVENTOR.

3,049,663
IGNITION AND ELECTRICAL CIRCUIT
TESTING DEVICE
John E. B. Sauer, Huntington Park, Calif., assignor of fifty percent to Orville B. Stoltz, Huntington Park, Calif.
Filed Sept. 8, 1959, Ser. No. 838,622
5 Claims. (Cl. 324—15)

This invention relates generally to electrical equipment and more particularly to a testing device for utilization in the testing of ignition and electrical ssytems of automotive, marine and airplane internal combustion engines, etc.

Although many testing devices are available to the mechanic and repairman for tracing the cause of circuit malfunction, they are often expensive to purchase and cumbersome to utilize. Further, the devices are often confined to the testing of a single element for a specific malfunction and therefore the versatility is limited. Accordingly, it is the principal object of this invention to provide a novel testing device for ignition and electrical circuits which detects a variety of malfunctions and which may be compactly built so as to not be cumbersome in usage. Also, since the device is simple in construction and operation, it is reliable, durable and inexpensive to manufacture.

It is a further object of this invention to provide a testing device for ignition circuits which may be employed to aid in starting a gas flooded or water soaked engine. Also, the tester, when properly utilized, instantly points out leaks, open circuits, short circuits, and weak or faulty electrical parts and wiring.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the invention particularly illustrating the outward appearance of the housing thereof;

FIGURE 2 is a vertical sectional view taken substantially along the plane 2—2 of FIGURE 1; and FIGURE 3 is a schematic diagram illustrating the proper electrical elements and connections thereto.

With continuing reference to the drawings, numeral 10 generally represents the testing device including an insulative tubular housing 12 enclosing the circuit components illustrated in FIGURE 3.

A pair of spaced conductive blades 14 and 16 extend outwardly from the tubular housing 12 through an insulative bottom end plug 18. An insulative strip 20 as of mica, is accommodated between the blades 14 and 16 to insulate them from each other. Transversely extending end portions 22 and 24 on blades 14 and 16 respectively are connected to conductors 26 and conductive brackets 28 by screws 30 and 32 respectively. Branching off from the conductor 26 is conductor 27 extending electrically to resistor 34. Electrically connected in parallel with the resistor 34 is an electro-magnetic coil 36 wound on magnetic core 38. A first fixed contact 40 is electrically connected to the junction 42 of the resistor 34 and coil 36. A movable contact 44 normally engaged with the contact 40 is electrically connected through conductor 46 to the blade 16.

A capacitor 48 is connected to conductor 50 to the blade 16. The other terminal of the capacitor is adapted to be contacted by spring contact 52 which in turn is electrically connected to the junction 42 previously mentioned. The push button 54 may bear against the spring contact 52 in order to close the circuit to the capacitor 48 for testing the condenser in the ignition circuit by comparing the results before and after capacitor 48 is cut in.

All the circuit components illustrated in FIGURE 3 are received within the tubular housing 12. An insulative end plug 56 closes the tubular housing remote from the plug 18. A keyway 58 is provided in the plug 56. Rotatably extending through the plug 58 is a push button 54 having a lock pin 62 extending radially from either side thereof. When the push button 54 is rotated so that the lock pin 62 is received within a keyway 58, the push button will be out of engagement with the spring contact 52 and the circuit to the capacitor 48 will be open. When the push button 54 is depressed so that the lock pin 62 is not within the keyway 58, it may be rotated to the position as illustrated in FIGURE 2 so that it remains in bearing relationship against the spring contact 52 for closing the circuit to the capacitor 48.

A pocket clip 66 may be provided on the outside of the tubular housing 12 in order to enable the tester 10 to be easily carried, as like a pencil. In the utilization of the testing device above described, the metal blades 14 and 16, each approximately 1/64 of an inch in thickness, are inserted between the ignition point contact of the ignition system to be tested, thereby connecting the tester circuit in series with the electric circuit of the ignition system. By placing the blades in that manner, the electro-magnetic coil 36 forms part of the primary circuit of the ignition system and accordingly the contacts 40 and 44 continue to make and break the primary circuit. This will be apparent inasmuch as the magnetic field set up by the electromagnetic coil and core 38 initially pull the arm of the contact 44 to open the circuit thereby collapsing the magnetic field to release the contact 44 to reengage it with the contact 40. Thus, the induction coil of the ignition system will emit a steady stream of secondary spark from which various ignition tests may be made. By properly utilizing the push button 54, the capacitor 48, which is preferably a foil capacitor, may be electrically placed across the contacts 40 and 44. Accordingly, it will be apparent that the testing device disclosed is able to trace the particular malfunction. Since the tester is small, fast, accurate and positive, it will be convenient to utilize and will disclose various ignition trouble in seconds, thus saving hours of tedious troubleshooting.

An additional use for the tester often arises when it is desired to start gas flooded or water-soaked engines. The structural arrangement of the housing enables the tester to be easily carried as a pen or pencil in the pocket.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A testing device for ignition circuits comprising a pair of flat spaced conductive blades receiving a thin insulative strip therebetween, said blades adapted to be clamped between a set of ignition points, an electro-magnetic coil electrically connected to a first of said blades at a first terminal thereof, a first contact electrically connected to said electro-magnetic coil at a second terminal thereof, a second contact, resilient means urging said contacts together, said contacts being urged out of engagement by said coil when it is energized by current conducted through said contacts when the contacts are closed, said second contact electrically connected to said second blade, a capacitor, means for connecting said capacitor across said contacts, a tubular housing, said coil, contacts, and capacitor received in said housing, said blades extending outwardly from said housing.

2. A testing device for ignition circuits comprising a pair of flat spaced conductive blades receiving a thin insulative strip therebetween, said blades adapted to be clamped between a set of ignition points, an electromagnetic coil electrically connected to a first of said blades at a first terminal thereof, a first contact electrically connected to said electro-magnetic coil at a second terminal thereof, a second contact, resilient means urging said contacts together, said contacts being urged out of engagement by said coil when it is energized by current conducted through said contacts when the contacts are closed, said second contact electrically connected to said second blade, a capacitor, means for connecting said capacitor across said contacts, a tubular housing, said coil, contacts, and capacitor received in said housing, said blades extending outwardly from said housing, said means for connecting said capacitor including a spring contact, a push button extending from said tubular housing above said contact, said push button adapted to bear against said spring contact for carrying it into connection with said capacitor.

3. A testing device for ignition circuits comprising a pair of flat spaced conductive blades receiving a thin insulative strip therebetween, said blades adapted to be clamped between a set of ignition points, an electromagnetic coil electrically connected to a first of said blades at a first terminal thereof, a first contact electrically connected to said electro-magnetic coil at a second terminal thereof, a second contact, resilient means urging said contacts together, said contacts being urged out of engagement by said coil when it is energized by current conducted through said contacts when the contacts are closed, said second contact electrically connected to said second blade, a capacitor, means for connecting said capacitor across said contacts, a tubular housing, said coil, contacts, and capacitor received in said housing, said blades extending outwardly from said housing, said means for connecting said capacitor including a spring contact, a push button extending from said tubular housing above said contact, said push button adapted to bear against said spring contact for carrying it into connection with said capacitor, and means for maintaining said button in said bearing relationship, said means including a collar in said housing, a keyway in said collar, a lock pin extending from said push button on either side thereof, said button rotatably extending through said collar, whereby said button bears against said spring contact when said lock pin is not received in said keyway.

4. A testing device comprising an insulative tubular housing, an insulative plug closing a first end of said housing, first and second flat and slightly spaced conductive blades lying in parallel planes extending through said plug externally of said housing, each of said first and second blades having terminal portions secured within said housing, an electromagnetic coil in said housing electrically connected at a first terminal thereof to said first blade terminal, a first contact electrically connected to said electromagnetic coil at a second terminal thereof, a second contact normally engaged with said first contact and movable out of engagement therewith in response to the energization of said coil, means normally urging said contacts into engagement with each other, said second contact electrically connected to said second blade.

5. A testing device comprising an insulative tubular housing, an insulative plug closing a first end of said housing, first and second spaced conductive blades extending through said plug externally of said housing, each of said first and second blades having terminal portions secured within said housing, an electromagnetic coil in said housing electrically connected at a first terminal thereof to said first blade terminal, a first contact electrically connected to said electromagnetic coil at a second terminal thereof, a second contact normally engaged with said first contact and movable out of engagement therewith in response to the energization of said coil, means normally urging said contacts into engagement with each other, said second contact electrically connected to said second blade, a capacitor in said housing, means for connecting said capacitor across said contacts, said means including a spring contact, a push button extending from said tubular housing above said contact, said push button adapted to bear against said spring contact for carrying it into connection with said capacitor, and means for maintaining said button in said bearing relationship, said means including a collar in said housing, a keyway in said collar, a lock pin extending from said push button on either side thereof, said button rotatably extending through said collar, whereby said button bears against said spring contact when said lock pin is not received in said keyway.

References Cited in the file of this patent

UNITED STATES PATENTS

| | | |
|---|---|---|
| 1,980,721 | Jenkins | Nov. 13, 1934 |
| 2,164,148 | Swanson | June 27, 1939 |
| 2,474,073 | Sundt | June 21, 1949 |
| 2,617,950 | Lace | Nov. 11, 1952 |
| 2,648,816 | Schuch | Aug. 11, 1953 |
| 2,712,633 | Jameson | July 5, 1955 |
| 2,860,290 | Fettinger | Nov. 11, 1958 |
| 2,864,979 | Williamson | Dec. 16, 1958 |

FOREIGN PATENTS

| | | |
|---|---|---|
| 139,269 | Australia | Nov. 2, 1950 |